March 27, 1934.  F. M. WHITE  1,952,400
SPRING SYSTEM AND LIST PREVENTING MEANS FOR AUTOMOBILES
Filed Feb. 3, 1933  2 Sheets-Sheet 1
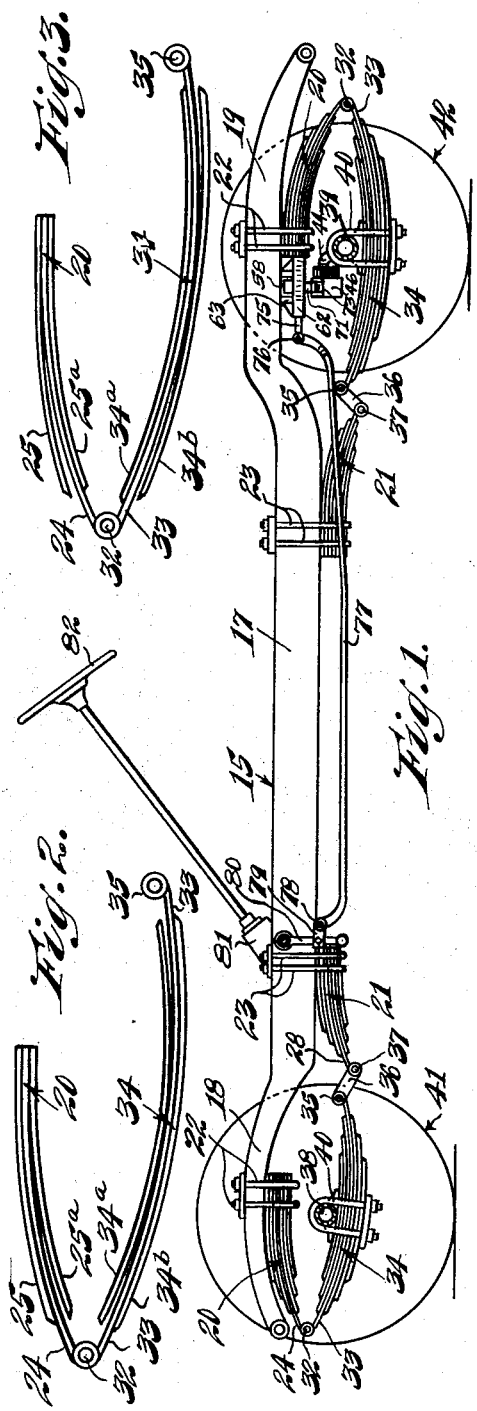
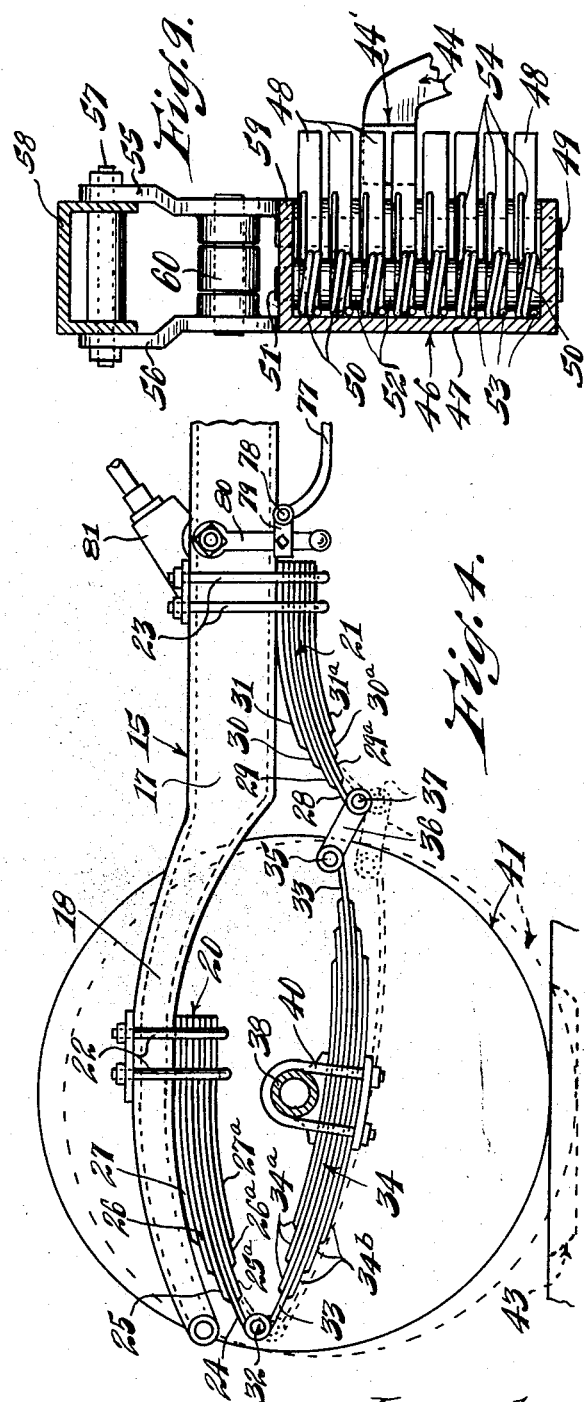
Witnesses:
E. E. Wessels
Everett A. Gibbs
Inventor:
Frank M. White,
By Joshua R H Potts
his Attorney.

March 27, 1934.    F. M. WHITE    1,952,400
SPRING SYSTEM AND LIST PREVENTING MEANS FOR AUTOMOBILES
Filed Feb. 3, 1933    2 Sheets-Sheet 2
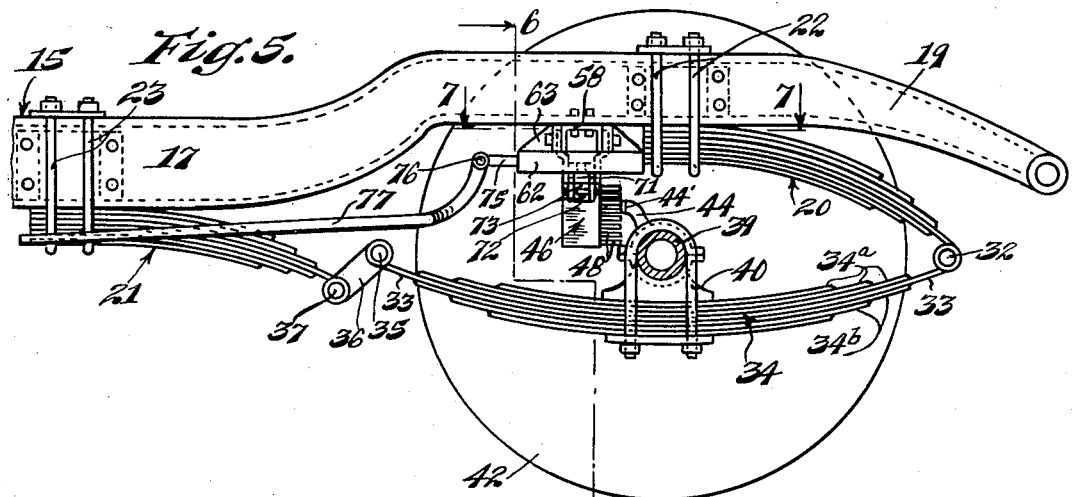
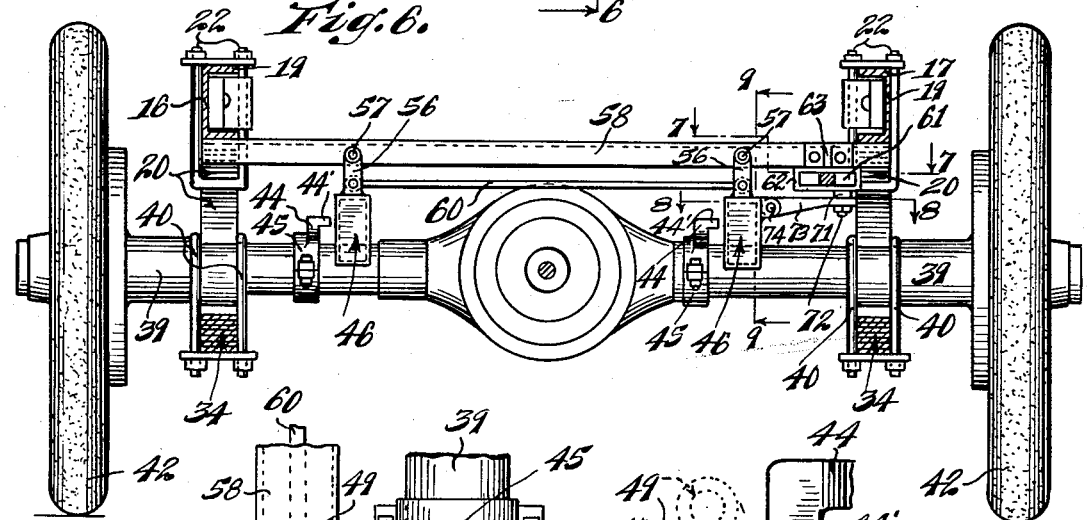
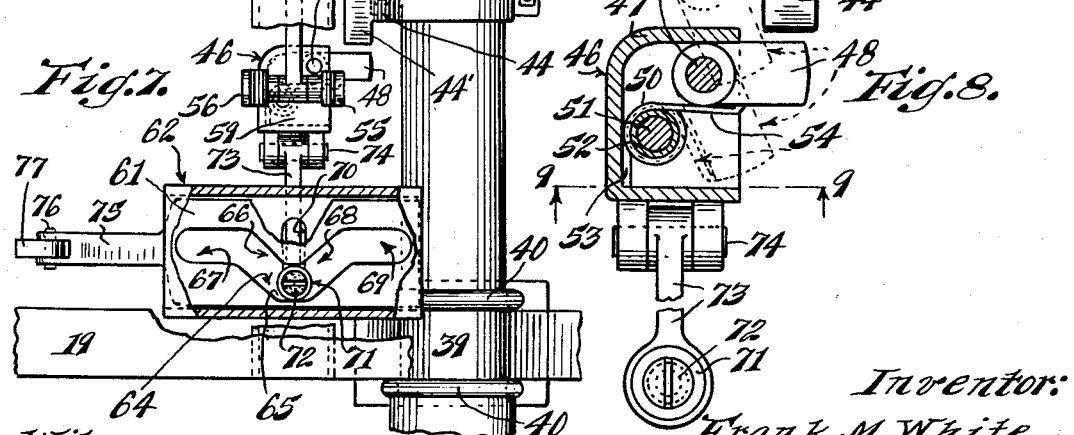
Witnesses:
C. E. Wessels
Everett A. Gibbs
Inventor:
Frank M. White,
By Joshua R. H. Potts
his Attorney.

Patented Mar. 27, 1934

1,952,400

UNITED STATES PATENT OFFICE 1,952,400

SPRING SYSTEM AND LIST PREVENTING MEANS FOR AUTOMOBILES

Frank M. White, Chicago, Ill., assignor of one-half to Elmer E. Colby, Chicago, Ill.

Application February 3, 1933, Serial No. 655,945

5 Claims. (Cl. 280—87)

This invention relates to automobiles and the like, and has for its object to produce an improved spring system for supporting the chassis frame whereby to secure greater sensitivity in the resiliency of the springs without decreasing the strength or adding to the weight thereof; to obviate the necessity for the utilization of separate shock absorbing and snubbing devices; to provide means for preventing the listing of the body when the vehicle is making turns; to provide for the automatic operation of the list preventing means; and to attain certain other advantages as will hereinafter more fully appear.

The invention consists in the parts and combinations and arrangements of parts hereinafter described and set forth with particularity in the appended claims.

In the accompanying drawings, illustrating a practical adaptation of the invention,—

Fig. 1 is a side elevation of a chassis frame of an automobile equipped with a system of supporting springs and list resisting devices according to the present invention;

Fig. 2 is a fragmentary diagram view illustrating the action of the chassis supporting springs under load compression;

Fig. 3 is a similar view, illustrating the action of the springs under snubbing expansion;

Fig. 4 is a fragmentary view, on an enlarged scale, showing the springs in full lines in normal set and in dotted lines in expanded snubbing action, and also showing the operating connection of the list resisting device with the steering arm;

Fig. 5 is a similar view showing the rear spring mounting and the mounting of the list resisting mechanism and its operating connection;

Fig. 6 is a section, taken substantially on the line 6—6 of Fig. 5;

Fig. 7 is a fragmentary horizontal section, on a further enlarged scale, taken on or about the lines 7—7 of Figs. 5 and 6;

Fig. 8 is a fragmentary horizontal section, on an enlarged scale, through the list resisting mechanism, and taken on or about the line 8—8 of Fig. 6; and Fig. 9 is a fragmentary vertical section through the list resisting mechanism, taken on or about the lines 9—9 of Figs. 6 and 8.

Referring now to the drawings, the numeral 15 designates the chassis frame of an automobile, of ordinary construction, comprising the right and left longitudinal side members 16 and 17, which are channel shaped in cross section throughout the main body portion thereof. The forward end portion of each of the side frames 16, 17, respectively, is arched, as at 18, and the rear end portion is similarly arched, as at 19, but relatively elongated, as shown.

The front and rear portions of the side frame members 16, 17, are mounted on springs comprising the base members 20 and 21, said base members 20 being fastened at one end by U-bolts or other suitable instrumentalities 22, while the base members 21 are similarly secured to the side frame members, as at 23.

Each spring base member 20 comprises a medial main leaf 24, on opposite sides of which are supplemental leaves of different lengths, the number of leaves and the relative proportions thereof being duplicated on each side of the main leaf 24. As shown, the main leaf 24 has a series of three of said supplemental leaves on its upper side, designated respectively 25, 26, and 27, the leaves on the under side being respectively numbered $25^a$, $26^a$, and $27^a$. Similarly, the base member 21 is provided with a medial main leaf 28 having on its upper side a series of three supplemental leaves 29, 30, and 31, and on its under side a similar series of supplemental leaves $29^a$, $30^a$, and $31^a$.

The free end portions of the main leaves 24 of the base spring members 20 are hinged, as at 32, to the ends of medial main leaves 33 of suspension spring members 34, the opposite end portions of said medial main leaves 33 being hingedly connected, as at 35, to link members 36 whose opposite end portions are hingedly connected, as at 37, to the free ends of the medial main leaves 28 of said base spring members 21. The suspension spring members 34 are mounted substantially midway between their ends on the front and rear axles 38, 39, respectively, by means of U-bolts 40 or other suitable instrumentalities. In a manner similar to the spring units or members 20 and 21, the units or members 34 are provided with supplemental leaves $34^a$ on the inner sides of the medial leaves 33, corresponding to the leaves 25, 26, 27, 29, 30, and 31, and on the outer sides thereof with supplemental leaves $34^b$, corresponding to the leaves $25^a$, $26^a$, $27^a$, $29^a$, $30^a$, and $31^a$, the only difference being that said leaves $34^a$ and $34^b$ extend equally on opposite sides of the fastening elements 40, whereas in the spring units or members 20 and 21 the supplemental leaves, of course, only extend from one side of their respective fastening elements 22 and 23.

The several spring members or units 20, 21, and 34 are given an original set so that, when under normal load of the vehicle body (not shown) and its occupants or contents on the chassis frame 15, the several supplemental leaves on opposite sides of the medial main leaves are in surface contact therewith, said leaves being fixedly secured with relation to each other in the immediate region where the spring units or members 20, 21, and 34 are mounted on the chassis frame 15 and front and rear axles 38 and 39, respectively, with sufficient security to prevent relative lateral movement between the medial main leaves and supplemental leaves, but relative longitudinal sliding movement being permitted between the respective cooperating leaves. In this connection, it may be here noted that any obvious means may be employed supplemental to the securing elements 22, 23, and 40, for preventing the relative lateral movement of the spring leaves, while permitting relative longitudinal movement thereof.

The number of supplemental leaves provided in each of the spring units or members 20, 21, and 34 depends upon the size of the car and the load to be imposed upon the springs, but, in any case, by having the duplicated series of supplemental leaves on each side of the medial main leaf the spring units or members 20, 21, and 34 may be composed of leaves of lighter gauge or thickness than is permissible in the usual spring structure where supplemental leaves are provided only on one side of the main leaf, resulting in more sensitivity in resilience and at the same time supporting the same normal load. The sensitivity of the spring support is further enhanced by the novel arrangement of the main base units or members 20 and 21 which are firmly supported to the chassis frame or body of the vehicle at one end and the hinged mounting of the suspension units or members 34 at one end on the free ends of the base units or members 20, and providing the hinged link connection 36 between the opposite ends of the suspension units or members 34 and said other base units or members 21.

As shown more clearly in Figs. 1, 4, and 5 of the drawings, the link members 36 are disposed obliquely or slantingly upward from the pivots 37 under normal conditions, the angularity being such that under compression or expansion in operation said link members 36 at all times move compensatorily with the suspension units or members 34 and the relative movements of the units or members 20 and 21.

Thus when either a front wheel 41 or rear wheel 42 strikes a depression or a protuberance the springs, due to their peculiar structural arrangements and mounting and resultant sensitivity, yield quickly, so that the wheel moves downwardly into the depression or upwardly upon the protuberance without any appreciable lowering or raising of the loaded chassis frame, due primarily to the provision of the supplemental series of leaves duplicated above and below the medial main leaves of the spring units or members 20, 21, and 34.

The action of the spring units or members 20, 21, and 34 when a depression is encountered in the travel of the vehicle on the roadway is illustrated more clearly in Fig. 4 of the drawings, wherein the wheel 41 and the chassis frame and spring members are shown in full lines in normal position, a depression in the roadway being designated by dotted lines, as at 43, and the wheel 41 being also shown in dotted lines as having entered the depression under the expansive action of the spring members, also shown in dotted lines, without lowering the chassis frame 15. Should the wheel 41 strike a protuberance on the roadway the wheel will be correspondingly raised without raising the chassis frame, inasmuch as the spring units or members 20, 21, and 34 will be compressed, acting reversely from the action occurring when the wheel enters a depression in the roadway. In the compressive action of the springs in operation, as illustrated diagrammatically in Fig. 2 of the drawings, the outer supplemental leaves follow the medial main leaves in close contact therewith throughout, but the free end portions of the inner supplemental leaves curl out of contact with said medial main leaves; while in the expansive action of the springs, as shown in Fig. 3, the action of the supplemental leaves is the reverse, or, in other words, the inner series of supplemental leaves follow the medial main leaves while the outer supplemental leaves curl away from said medial main leaves. This peculiar action of the leaves serves with shock absorbing or snubbing effect, under both compressive and expansive action of the springs, and obviates the necessity for providing special shock absorbers or snubbers in motor vehicle equipment, as is desirable or necessary under the ordinary spring structural arrangements and mountings.

In making a turn, especially at a road intersection or in rounding a street corner, the body of a motor vehicle or the like has a tendency to list or incline outwardly, due to the depression of the springs under the weight of the body and under the centrifugal force, which has a tendency to topple the vehicle. It is therefore preferable to provide means for preventing compression and expansion of the springs while the vehicle is making the turn, a practical arrangement and adaptation of which means will now be described.

It may be here noted that for practical purposes the list preventing means need be applied only upon and in the region of the rear axle, although it may be obviously applied in the region of both the front and rear axles. As shown more clearly in Fig. 6 of the drawings, the rear axle is provided with lug members or stops 44, preferably in the form of brackets having split supporting bands 45 which are clamped about the rear axle casing on opposite sides of the middle thereof. Movably mounted on the chassis frame or under side of the vehicle body are locking elements 46, each comprising a hollow housing 47, one side of which is open, said housing containing a multiplicity of dogs 48 which are hinged on a vertical shaft 49 and normally held yieldably in extended position by springs 50 which are coiled about a shaft 51 with spacing collars 52 therebetween, one end portion 53 of each spring engaging the adjacent side wall of the housing 47, the opposite end 54 of the spring pressing against the side of its correlated dog 48.

Normally the vertical series of spring-pressed dogs 48 of each locking element 46 are in relatively close relation to the plane of the horizontally projecting end portion 44' of the cooperating lug or stop member 44, with just sufficient clearance to permit the very limited transverse horizontal movement of the vehicle body on its front and rear axles, this limited movement being due to the arrangement and mounting of the spring members 20, 21, and 34, which, however, permit considerable relative up-and-down movement of the chassis frame on the axles.

The housings 47 of the locking elements 46 are mounted to be moved toward and away from the cooperating stop lugs 44, preferably by a pair of upward hanger extensions 55 and 56 which are pivotally mounted, as at 57, on the channeled cross member 58 secured on the under sides of the longitudinal side members 16 and 17 of the chassis frame. Said hanger members 55 and 56 are rigidly attached to and preferably formed integrally with the upper end wall 59 of the housing 47, the housing 47 and its rigid supporting hanger extensions 55 and 56 for the one side of the chassis frame being connected by a pivotally mounted cross rod 60 to the corresponding parts for the opposite side of the frame, as shown more clearly in Fig. 6 of the drawings, by which provision the two locking elements are swingable in unison into and out of engaging relation with respect to the correlated lugs or stop elements 44.

When the locking elements 46 are moved toward the stop lugs 44 the latter engage and depress the hingedly mounted dogs 48 of the locking element which are in register therewith, whereby said registering dogs 48 are moved against the tension of their springs 50, the horizontally extending end portion 44' of the stop lug 44 being then interposed between the normally positioned dogs 48 next above and below those which have been shifted out of normal position by the engagement of the stop lug, in which relation the chassis frame is positively locked against vertical movement, both upwardly and downwardly.

To effect an automatic actuation of the locking elements 46 into and out of engagement with said stop lugs 44, it is preferable to provide operating means with a suitable connection with some part of the steering gear whereby the locking elements are moved into interlocking engagement with the stop lugs 44 when the steering gear is operated in making both right and left hand turns, and out of such engagement when the steering gear is operated to drive the vehicle straight ahead after completion of the turn.

As shown, the operating means for the locking elements 46 comprises a longitudinal reciprocatory cam block or member 61 slidably mounted in a suitable housing or guideway 62 supported on the under side of the channeled cross member 58 by bracket extensions 63. The cam member or block 61 is provided with a cam slot 64 having a longitudinal middle portion 65 connected by a forward diagonal portion 66 to an offset forwardly extending longitudinal portion 67, and by a rearward diagonal portion 68 to an offset rearwardly extending longitudinal portion 69, while in the bottom of the supporting and guiding housing 62 is formed a transverse slot 70 through which and into the cam slot 64 is projected an antifriction roller 71 mounted on a stud 72 at the outer end of a connecting arm 73 whose inner end is pivotally attached, as at 74, to the side wall of the housing 47 of the adjacent locking element 46. By this arrangement, when the roller 71 is in the middle or neutral portion 65 of the cam slot 64 the link-connected locking elements 46 are out of engagement with the stop lugs 44, that is to say, said locking elements are in their normally disengaged relation to said stop lugs 44.

When the cam block or member 61 is moved longitudinally in either direction, the cam portion 66 or 68 engages the roller 71 and causes it to move transversely of the supporting and guiding housing 62 in the slot 70, the roller continuing to move transversely until it is engaged by either the offset forwardly extending portion 67 or the rearwardly extending portion 69 of said cam slot 64, whereupon the roller is locked against further transverse movement in the slot 70, but, due to the elongation of said portions 67 and 69 of the cam slot, the cam block or member 61 is free to move longitudinally in the same direction in which it moved to operate the roller 71.

At the forward end of the cam block 61 is an extension 75, at whose outer end portions is pivotally attached, as at 76, the end of a connecting rod 77 whose forward end portion is in turn pivotally attached, as at 78, to a bracket member 79 which is preferably adjustably mounted on the steering arm 80 which is a part of the regular steering gear 81 of the automobile, merely illustrated conventionally in the drawings and provided with the usual steering wheel 82.

By the construction and arrangement shown the locking elements 46 are positively moved into engaging and disengaging positions and held in such positions, and to effect a quick actuation of said elements 46, the inclined portions 66 and 68 of the cam slot 64 are formed rather abruptly; also to permit limited movement of the steering arm 80 without effecting movement of the cam block 61, the longitudinal middle portion 65 of the cam slot is slightly elongated, and, as above described, the offset longitudinal portions 67 and 69 are elongated to permit considerable movement of the steering arm 80 for turning the vehicle after the locking elements 46 have been engaged with the stop lugs 44.

The number of spring-pressed hingedly mounted dogs 48 provided in the locking element 46 will vary in different structures, but, for the average installation, there are preferably provided eight of said dogs, and the projecting end portion 44' of the stop lug 44 will also vary in thickness, but, according to the average structure as illustrated, it will be of a thickness corresponding approximately to the combined thickness of two adjoining dogs 48 so that in the operation of the device at least two of the dogs 48 will be simultaneously engaged by said end portion 44' of the stop lug 44, and at some times three of said dogs will be engaged by said end portion 44', depending upon the vertical position of the locking element 46 at the time the engagement is effected. So, too, the locking element 46 may be in different relative positions longitudinally of the chassis frame, that is to say, while the element 46, as illustrated in the drawings, is located in front of the rear axle 39, it may, in some cases, be located directly above the axle or to the rear thereof, depending upon the model of automobile or like vehicle to which the device is applied. In the structural arrangement illustrated the stop lug 44 is projected forwardly, as shown more clearly in Fig. 5 of the drawings, so as to present the end extension 44' in the path of the normally projected dogs 48 of the locking element 46.

Obviously, the structure admits of considerable modification without departing from the spirit and scope of the invention as defined by the appended claims. The invention, therefore, is not limited to the specific construction and arrangement shown.

Having thus described my invention, what I claim as new and desire to secure by Letters Patent is:

1. In a motor vehicle, the combination of the body frame, axle, supporting springs between the axle and body frame, and releasable locking means operably connected with the steering gear of the vehicle to be thereby effectively actuated when the vehicle is steered out of a direct path, whereby to prevent relative vertical movement between the body frame and axle.

2. In a motor vehicle, the combination of the body frame, axle, supporting springs between the axle and body frame, and laterally shiftable locking means operably connected to the steering gear of the vehicle to be thereby effectively actuated to prevent relative vertical movement between the body frame and axle when the vehicle is steered out of a direct path.

3. In a motor vehicle or the like, means for preventing relative vertical movement between the body of the vehicle and its axle, said means comprising a stop member on the axle and a locking element movably supported on the body laterally with respect to said stop member, and means connected with the steering gear of the vehicle for automatically moving said locking element into and out of engagement with said stop member.

4. In a motor vehicle or the like, means for preventing relative vertical movement between the body of the vehicle and its axle, said means comprising a stop member on the axle and a locking element movably supported on the body laterally with respect to said stop member, said locking element comprising a vertical series of independently movable members respectively engageable with said stop member when the latter is in different vertical positions relative to said locking element, and means for moving said locking element toward and from said stop member, said stop member, when said locking element is moved toward and thereagainst, depressing the engaged movable members and entering between the next adjoining movable members above and below said depressed movable members of the locking element whereby to prevent relative vertical movement between the body of the vehicle and its axle.

5. In a motor vehicle or the like, means for preventing relative vertical movement between the body of the vehicle and its axle, said means comprising a stop member on the axle and a locking element movably supported on the body laterally with respect to said stop member, said locking element comprising a vertical series of independently movable members respectively engageable with said stop member when the latter is in different vertical positions relative to said locking element, and means operably connected with the steering gear of the vehicle for moving said locking element toward and from said stop member, said stop member, when said locking element is moved toward and thereagainst, depressing the engaged movable members and entering between the next adjoining movable members above and below said depressed movable members of the locking element whereby to prevent relative vertical movement between the body of the vehicle and its axle.

FRANK M. WHITE.